United States Patent
Phelps et al.

(10) Patent No.: US 8,139,729 B2
(45) Date of Patent: Mar. 20, 2012

(54) SYSTEMS AND METHODS FOR HANDLING CALLS ASSOCIATED WITH AN INTERACTIVE VOICE RESPONSE APPLICATION

(75) Inventors: David E. Phelps, Colorado Springs, CO (US); Brian S. Badger, Dallas, TX (US); Brian E. Somes, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2093 days.

(21) Appl. No.: 11/115,374

(22) Filed: Apr. 27, 2005

(65) Prior Publication Data

US 2006/0245574 A1    Nov. 2, 2006

(51) Int. Cl.
*H04M 11/00* (2006.01)

(52) U.S. Cl. .................................. 379/88.18; 379/156

(58) Field of Classification Search .... 379/88.01–88.04, 379/88.13, 88.17, 88.2, 88.18, 88.21, 212.01, 379/230, 211, 158, 202.01, 207.01; 370/260–266
See application file for complete search history.

(56) References Cited

U.S. PATENT DOCUMENTS

| | | | | |
|---|---|---|---|---|
| 4,993,014 A * | 2/1991 | Gordon | ........................ | 370/225 |
| 5,163,083 A * | 11/1992 | Dowden et al. | ............ | 379/88.03 |
| 5,327,492 A * | 7/1994 | Parola | ............................. | 379/361 |
| 5,590,186 A * | 12/1996 | Liao et al. | ................. | 379/211.02 |
| 5,604,794 A * | 2/1997 | Vogel et al. | ................. | 379/93.14 |
| 5,787,150 A * | 7/1998 | Reiman et al. | ............. | 379/88.12 |
| 5,862,208 A * | 1/1999 | MeLampy et al. | ....... | 379/212.01 |
| 5,978,940 A * | 11/1999 | Newman et al. | .............. | 714/712 |
| 6,195,422 B1 * | 2/2001 | Jones et al. | ............. | 379/127.05 |
| 6,314,175 B1 * | 11/2001 | Jones | ............................. | 379/229 |
| 6,345,093 B1 * | 2/2002 | Lee et al. | ................. | 379/265.12 |
| 6,349,209 B1 * | 2/2002 | Foladare et al. | ............. | 455/445 |
| 6,404,746 B1 * | 6/2002 | Cave et al. | ..................... | 370/262 |
| 6,430,284 B1 * | 8/2002 | Jones | ............................ | 379/229 |
| 6,496,567 B1 * | 12/2002 | Bjornberg et al. | .......... | 379/88.02 |
| 6,512,818 B1 * | 1/2003 | Donovan et al. | .......... | 379/88.18 |
| 6,721,705 B2 * | 4/2004 | Kurganov et al. | .......... | 704/270.1 |
| 6,748,225 B1 * | 6/2004 | Kepler | ........................ | 455/456.2 |
| 6,839,323 B1 * | 1/2005 | Foti | ................................ | 370/235 |
| 6,907,455 B1 * | 6/2005 | Wolfe et al. | .................. | 709/217 |
| 6,917,677 B2 * | 7/2005 | Da Palma et al. | ........ | 379/218.01 |
| 6,963,285 B2 * | 11/2005 | Fischer et al. | ................. | 340/635 |
| 6,965,614 B1 * | 11/2005 | Osterhout et al. | ........... | 370/466 |
| 6,978,002 B1 * | 12/2005 | Cope et al. | ................. | 379/202.01 |
| 7,026,925 B2 * | 4/2006 | Roche et al. | .................. | 340/531 |
| 7,035,384 B1 * | 4/2006 | Scherer | ...................... | 379/88.19 |
| 7,046,680 B1 * | 5/2006 | McDysan et al. | ............. | 370/396 |
| 7,050,563 B2 * | 5/2006 | Dammrose | .................... | 379/229 |

(Continued)

OTHER PUBLICATIONS

Schulzrinne et al., "RTP Payload for DTMF Digits, Telephony Tones and Telephony Signals", Internet Engineering Task Force, Request for Comment 2833, May 2000.

(Continued)

*Primary Examiner* — Fan Tsang
*Assistant Examiner* — Assad Mohammed

(57) ABSTRACT

A method for processing a call is provided. The method includes receiving an inbound call leg via a network device. The inbound call leg is processed using an interactive voice response (IVR) device, and an outbound call leg is generated based on processing the inbound call leg. The outbound call leg is made available to the network device. The inbound call leg and the outbound call leg are handed off from the IVR device to the network device.

25 Claims, 9 Drawing Sheets

U.S. PATENT DOCUMENTS

| | | | |
|---|---|---|---|
| 7,092,738 B2* | 8/2006 | Creamer et al. | 455/563 |
| 7,099,451 B1* | 8/2006 | Jordan et al. | 379/212.01 |
| 7,136,466 B1* | 11/2006 | Gao | 379/93.23 |
| 7,180,985 B2* | 2/2007 | Colson et al. | 379/88.16 |
| 7,184,418 B1* | 2/2007 | Baba et al. | 370/331 |
| 7,251,254 B2* | 7/2007 | Bond et al. | 370/467 |
| 7,254,222 B1* | 8/2007 | Bauer et al. | 379/114.2 |
| 7,254,643 B1* | 8/2007 | Peters et al. | 709/246 |
| 7,286,521 B1* | 10/2007 | Jackson et al. | 370/352 |
| 7,327,746 B1* | 2/2008 | Au et al. | 370/410 |
| 7,372,957 B2* | 5/2008 | Strathmeyer et al. | 379/265.01 |
| 7,388,950 B2* | 6/2008 | Elsey et al. | 379/201.02 |
| 7,409,055 B2* | 8/2008 | Ruckart | 379/357.03 |
| 7,433,459 B2* | 10/2008 | Reding et al. | 379/265.09 |
| 7,436,940 B2* | 10/2008 | Adamczyk et al. | 379/88.18 |
| 7,454,510 B2* | 11/2008 | Kleyman et al. | 709/231 |
| 7,570,765 B1* | 8/2009 | Eslambolchizadeh | 380/257 |
| 7,693,134 B2* | 4/2010 | Batni et al. | 370/352 |
| 7,760,744 B1* | 7/2010 | Mohaban | 370/401 |
| 2003/0002448 A1* | 1/2003 | Laursen et al. | 370/261 |
| 2003/0067887 A1* | 4/2003 | Truetken | 370/261 |
| 2003/0097447 A1* | 5/2003 | Johnston | 709/227 |
| 2003/0145054 A1* | 7/2003 | Dyke | 709/205 |
| 2003/0163625 A1* | 8/2003 | Kadambi et al. | 710/303 |
| 2003/0185374 A1* | 10/2003 | Baker | 379/220.01 |
| 2003/0199315 A1* | 10/2003 | Downes | 463/28 |
| 2004/0058709 A1* | 3/2004 | Zabawskyj et al. | 455/560 |
| 2004/0117185 A1* | 6/2004 | Scarano et al. | 704/254 |
| 2004/0161079 A1* | 8/2004 | Virzi et al. | 379/88.02 |
| 2004/0187033 A1* | 9/2004 | Wang | 713/201 |
| 2004/0205209 A1* | 10/2004 | Wengrovitz et al. | 709/230 |
| 2005/0025127 A1* | 2/2005 | Strathmeyer | 370/352 |
| 2005/0047389 A1* | 3/2005 | Bond et al. | 370/351 |
| 2005/0047556 A1* | 3/2005 | Somerville et al. | 379/9.01 |
| 2005/0117726 A1* | 6/2005 | DeMent et al. | 379/142.01 |
| 2005/0180404 A1* | 8/2005 | Kwon | 370/352 |
| 2005/0182672 A1* | 8/2005 | Hemm et al. | 705/9 |
| 2006/0203802 A1* | 9/2006 | Chou et al. | 370/352 |

OTHER PUBLICATIONS

"Packet-Based Multimedia Communications Systems", International Telecommunication Union, ITU-T H.323, Jul. 2003.

Rosenberg et al., "SIP: Session Initiation Protocol", Internet Engineering Task Force, Request for Comment 2543, Oct. 2001.

Rosenberg et al., "SIP: Session Initiation Protocol", Internet Engineering Task Force, Request for Comment 3261, Jun. 2002 (Obseletes 2543).

Floyd et al., "An Extension to the Selective Acknowledgement (SACK) Option for TCP", Internet Engineering Task Force, Request for Comment 2883, Jul. 2000.

* cited by examiner

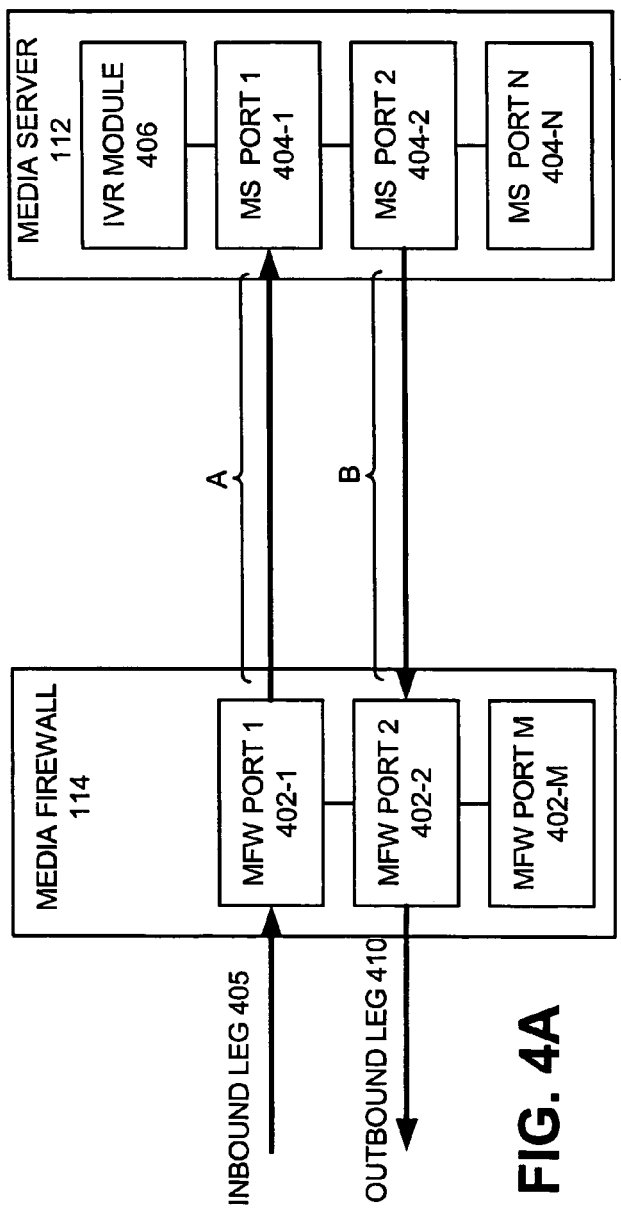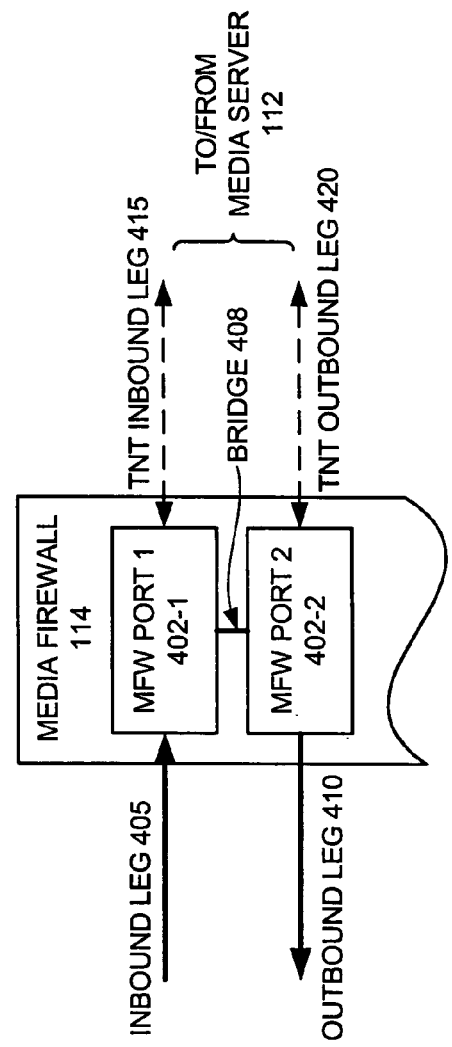
FIG. 4A
FIG. 4B

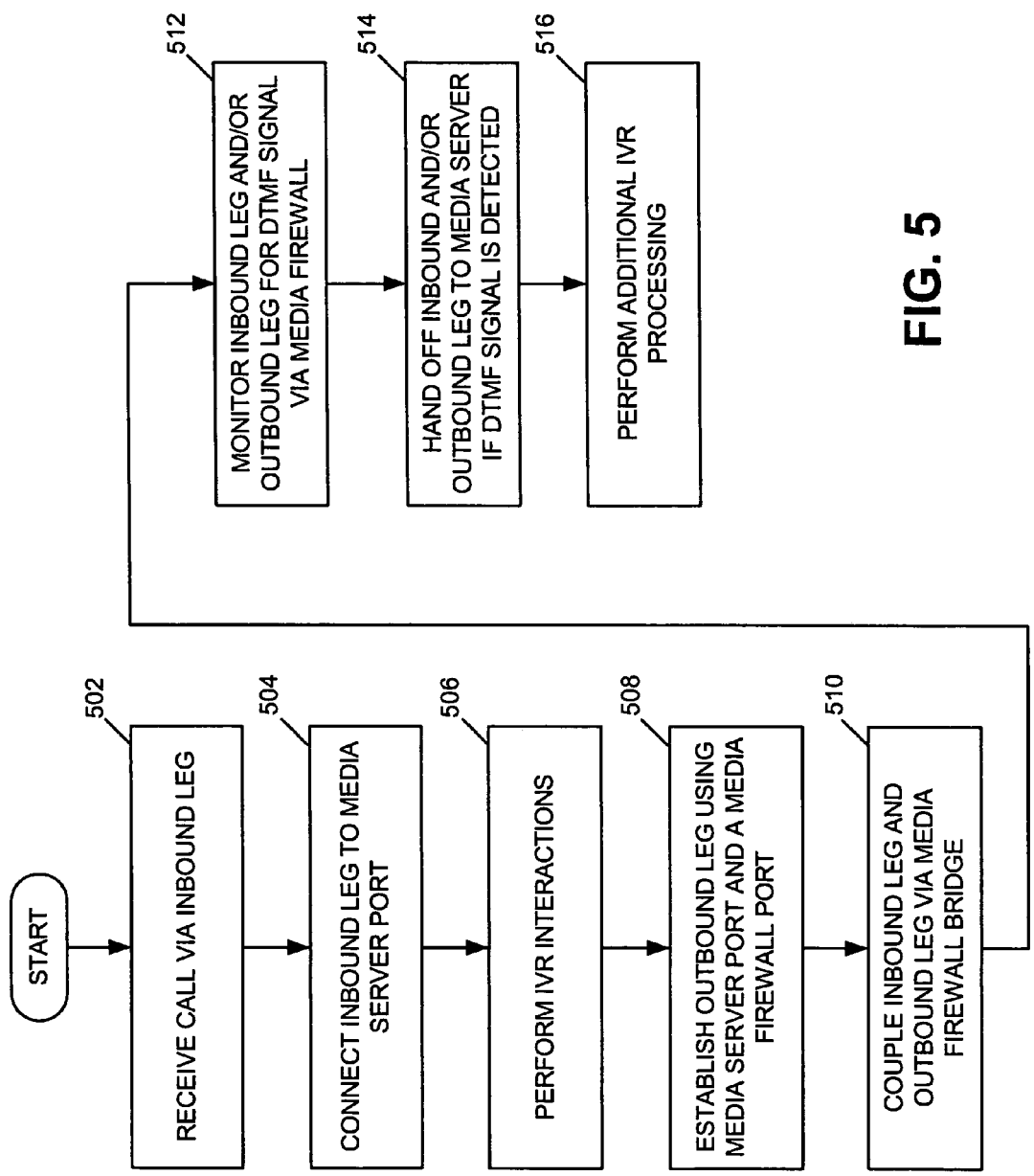

SYSTEMS AND METHODS FOR HANDLING CALLS ASSOCIATED WITH AN INTERACTIVE VOICE RESPONSE APPLICATION

FIELD OF THE INVENTION

Implementations consistent with the invention relate generally to communication networks and, more particularly, to systems and methods for implementing call handoffs associated with an interactive voice response (IVR) application operating in an Internet protocol environment.

BACKGROUND OF THE INVENTION

Historically, voice-based telephone communications have been handled via dedicated networks, such as the public switched telephone network (PSTN), while data communications have been handled via dedicated packet networks, such as Internet protocol (IP) networks. A current trend is to converge these two types of networks, where telephone voice traffic and other forms of real-time media are converted into digital form and carried by a packet data network along with other forms of data These converged networks may offer many advantages, such as lower operating costs as compared to maintaining separate voice and data networks, greater flexibility regarding service offerings to customers, such as multimedia conferencing, and more efficient use of network resources, such as network hardware and software.

Conventional telephones may employ dual-tone multifrequency (DTMF) signals for placing calls to a called party. DTMF techniques assign dual tones to each number on a keypad associated with a telephone handset. When a user depresses a number, a unique dual-tone signal may be generated. The PSTN uses DTMF signals to route calls through appropriate intermediary devices, such as central offices and switches, to arrive at a desired destination associated with a called party. Converged networks may employ telephone gateways for converting PSTN signals, such as DTMF signals, into packetized data for use in a data network, such as the Internet. Telephone gateways may digitize DTMF signals and encode them into standardized formats for use with portions of the network running packet protocols.

Users of converged network telephone services may use DTMF tones for dialing destination phone numbers and for performing other applications on converged networks. For example, users may require assistance and/or information from service providers, corporations, institutions, and/or government agencies using a telephone device. In many instances, a user may interact with an interactive voice response (IVR) system while obtaining assistance and/or information.

IVR systems may be used for processing incoming calls. For example, a customer may call a telephone company to report a problem with a telephone line. The telephone company may employ an IVR system for processing incoming calls. When the call is received at the telephone company, an IVR system may answer the call and prompt the user to enter, for example, a telephone number associated with a malfunctioning line via a recorded message. The IVR system may detect a series of DTMF signals associated with a sequence of digits depressed by the user in response to the IVR prompts. Efficiently operating IVR systems may require that operators of these systems attempt to handle calls in a cost effective manner.

SUMMARY OF THE INVENTION

In accordance with an aspect of the invention, a first network device for establishing a communication session with a destination is provided. The first network device may include, a first network interface configured to receive a first inbound portion of an inbound call leg, and make the first inbound portion available to a second network device, where the first inbound portion between the first network device and the second network device is referred to as a second inbound portion. The first network device may include a second network interface configured to receive a first outbound portion of an outbound call leg that originates from the second network device, and make the first outbound portion available to the destination, where the first outbound portion between the first network device and the destination is referred to as a second outbound portion. The first network device may include a processor operatively associated with the first network interface and the second network interface. The processor may be configured to make the second inbound portion available to the second network device, receive the first outbound portion when the second network device has interacted with the second inbound portion, and bridge the first inbound portion to the second outbound portion.

In accordance with another aspect of the invention, a media server is provided. The media server may include an interactive voice response (IVR) module for processing a dual tone multifrequency (DTMF) signal associated with an inbound call leg. The media server may include a first network interface for receiving the inbound call leg, and a second network interface for making an outbound call leg available to a network device. The media server may include a processor configured to make the inbound call leg available to the IVR module, establish the outbound call leg based on the processing performed by the IVR module, and handoff the inbound call leg and the outbound call leg to the network device.

In accordance with still another aspect of the invention, a system configured to establish a communication session in a communications network is provided. The system may include, a media server having a first media server port and a second media server port. The system may include a media firewall configured to receive an inbound call leg via the network, the received inbound call leg being a first inbound call leg, make the inbound call leg available to the first media server port to form a second inbound call leg, receive an outbound call leg from the second media server port, the received outbound call leg being a first outbound call leg, make the outbound call leg available to a destination device to form a second outbound call leg, and bridge the first inbound call leg to the second outbound call leg, where the bridging causes the media server to be removed from the communication session.

In accordance with yet another aspect of the invention, a method for processing a call is provided. The method may include receiving an inbound call leg via a network device and processing the inbound call leg using an interactive voice response (IVR) device. The method may include generating an outbound call leg based on processing of the inbound call leg and making the outbound call leg available to the network device. The method may include handing off the inbound call leg and the outbound call leg from the IVR device to the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4A and 4B illustrate exemplary implementations for processing a call using a media firewall and a media server consistent with the principles of the invention;

FIG. 5 illustrates an exemplary flowchart showing a method for processing a call in accordance with an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention may provide call bridging in IVR applications using media firewall ports in lieu of media server ports. In this way, the media server may be freed up to perform other functions.

EXEMPLARY SYSTEM

Figure 1:
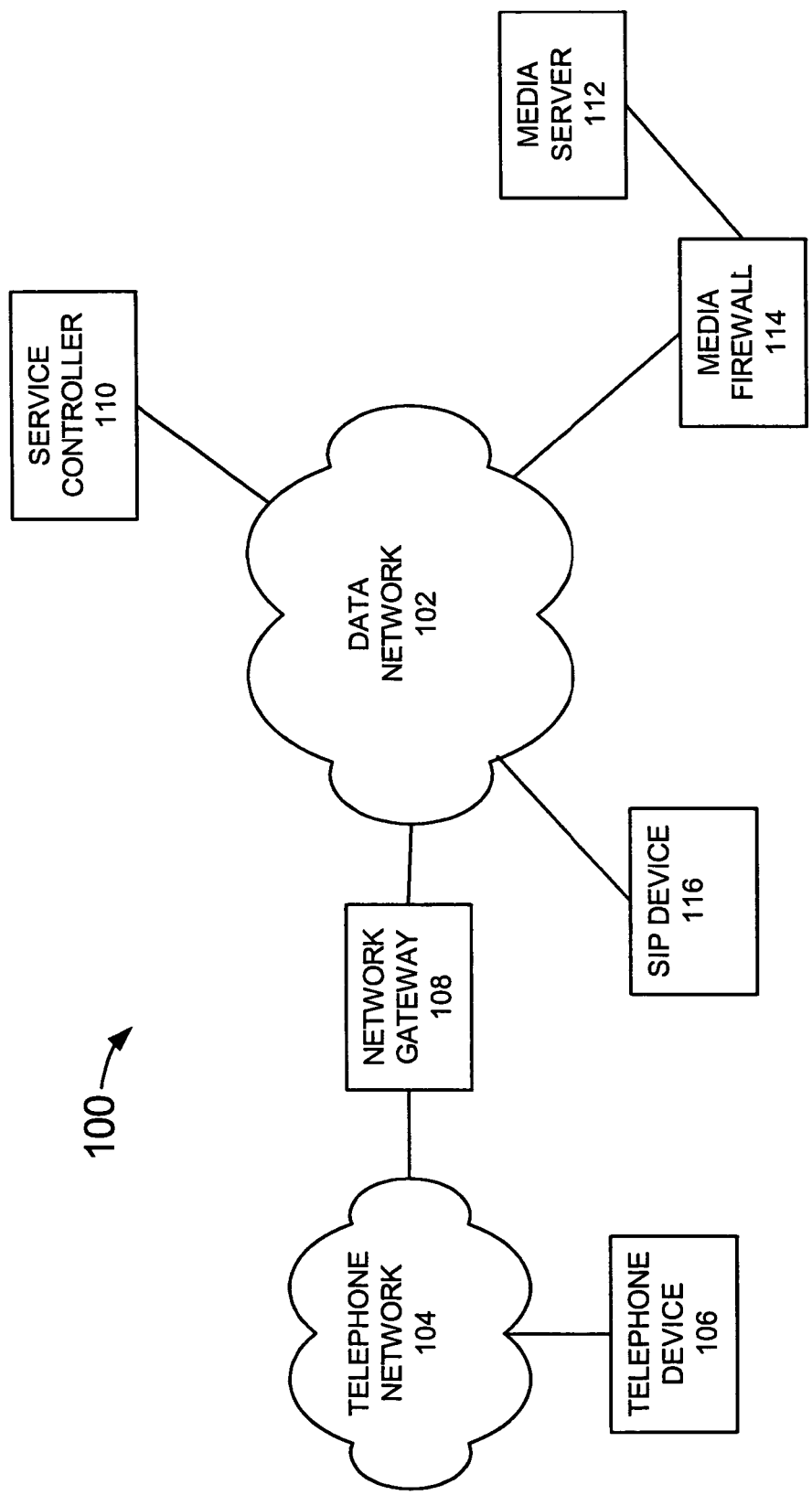
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a data network 102, a telephone network 104, a telephone device 106, a network gateway 108, a service controller 110, a media server 112, a media firewall 114 and a session initiation protocol (SIP) device 116. The number of devices illustrated in FIG. 1 is provided for simplicity. In practice, a typical system could include more or fewer devices than illustrated in FIG. 1. In addition, devices depicted as single entities in FIG. 1 may be implemented in a distributed fashion.

Data network 102 may include one or more networks, such as the Internet, an intranet, a local area network (LAN), a metropolitan area network (MAN), a wide area network (WAN), or another type of network that is capable of transmitting data from a source device to a destination device. Telephone network 104 may include one or more public switched telephone networks (PSTNs) or other types of switched networks. Telephone network 104 may also include one or more wireless networks.

Telephone device 106 may include any device capable of making and/or receiving calls using PSTN compatible signals. For example, telephone device 106 may include a plain old telephone system (POTS) handset. Telephone device 106 may include a landline telephone device or a wireless telephone device. Telephone device 106 may be implemented as a standalone telephone device or may be integrated with other devices, such as an intercom device, a two-way messaging system, a display terminal, a personal organizer, etc.

Network gateway 108 may include one or more devices that allow divergent transport networks to cooperatively carry traffic. Network gateway 108 may provide for interoperation between different signaling schemes and between different media forms. For example, network gateway 108 may adapt between SS7 signaling of telephone network 104 and SIP or H.323 protocols used by data network 102. At the same time, network gateway 108 may adapt analog voice signals in a telephone bearer channel to a packetized data stream suitable for transport over data network 102. Moreover, network gateway 108 may convert DTMF signals into RFC 2833 compatible digital representations for use in data network 102.

Service controller 110 may include one or more devices configured to facilitate control of media server 112 and media firewall 114. For example, service controller 110 may operate to coordinate initial routing of a voice path through media firewall 114 in route to media server 112. In addition, service controller 110 may operate to re-route or drop inbound call legs to media server 112. Service controller 110 may also operate to re-route, or drop, outbound call legs originating at media server 112. Implementations of service controller 110 may be configured as a SIP application server having proxy server functionality that facilitates the establishment of SIP calls and/or location server functionality that provides a repository for end user information to enable, for example, address validation, feature status, and real-time subscriber feature configuration. SIP is a signaling protocol for initiating, managing and terminating voice and video sessions across packet networks. SIP may be used to facilitate flexible system architectures capable of handling media types in substantially real-time, such as voice, video, and images.

Media server 112 may include a server configured to receive data, or requests, from devices such as conventional telephones, SIP device 116, mobile phones, facsimile machines, computers, and/or personal digital assistants (PDAs). Media server 112 may support advanced processing of voice and/or media streams. For example, media server 112 may provide for voice announcements, multi-party conferencing, messaging, text-to-speech (TTS), speech recognition, and IVR.

Media server 112 may employ circuit media via a telephony interface, such as legacy T1, digital signal (DS)-3, and call control protocols, and/or packet media, such as IP media. Media server 112 may utilize application programming interfaces (APIs) and protocols for controlling media resources at the server, or platform, level. For example, voice extensible markup language VoiceXML, speech application language tags (SALT) or Java based APIs, such as S.410 may be used for implementing APIs. In one implementation, media server 112 may operate to provide IVR capabilities to a contact center, such as a help desk associated with a telephone company. As used herein, contact center refers to any destination (e.g., a called party) that uses DTMF signals alone, or in combination with other techniques, for receiving inputs from a calling party. For example, a contact center may be a financial institution, a voice mail system, an ordering application, a human resources application, an educational institution and/or a government entity that employs DTMF signaling to process a portion of a call received from a calling party. Contact centers may use DTMF signals exclusively, or they may use DTMF signals in conjunction with other signaling techniques such as voice recognition, text, and/or specialized signaling devices.

Media firewall 114, also referred to as a session border controller (SBC), may include a device operating as a firewall and/or a signaling and media routing platform. In one implementation, media firewall 114 may operate at a network border. For example, media firewall 114 may operate at the border of data network 102 to protect media server 112 from unauthorized packets. Media firewall 114 may have a public side, or interface, and a private side, or interface. The public side may be coupled to an unsecured, or untrusted, network such as the Internet, while the private side may be coupled to a trusted network, such as a corporate LAN. Media firewall 114 may allow only authorized packets to pass from the public side to the private side. Media firewall 114 may be configured to handle network address translation (NAT) traversal issues so that quality of service (QoS) sensitive applications may be used, such as voice-over-IP (VoIP) and real-time media. Media firewall 114 may also be adapted to allow peering with other network devices, such as network gateway 108. Media firewall 114 may support multiple protocols, such as SIP, H.323-signaled real-time protocol (RTP) media, and processing of DTMF signals.

Media firewall 114 may be implemented as a media pivot in one implementation. Media pivot, as used herein, refers to a device capable of performing DTMF detection and/or bridging an input port to an output port. For example, a media pivot may be implemented in software to provide DTMF detection at a low per-port cost as compared with media firewall ports and/or media server ports.

SIP device 116 may include any client (e.g., a computer device, a web-appliance, etc.) that is configured to provide SIP telephone functions. SIP device 116 may be implemented in a standalone device, such as a dedicated SIP phone, and/or SIP device 116 may be incorporated with other devices such as a SIP/PSTN-hybrid phone. SIP device 116 may also include a software client that may run, for example, on a conventional personal computer (PC), laptop computer, or personal digital assistant (PDA).

Although implementations consistent with the principles of the invention are described below in the context of a SIP and/or an IP-based network, one of ordinary skill in the art will recognize that implementations consistent with the invention may be generally applicable to other equivalent or analogous communication protocols (e.g., International Telecommunication Union (ITU) H.323) and/or types of transport networks (e.g., asynchronous transfer mode (ATM), frame relay, etc.). Both the ITU H.323 standard and the IETF's SIP are examples of protocols that may be used for establishing a communications session among terminals, such as telephone-like devices that may be connected to a network. The SIP protocol is described in IETF document RFC 2543 and its successors (RFC 3261 et al.).

Figure 2:
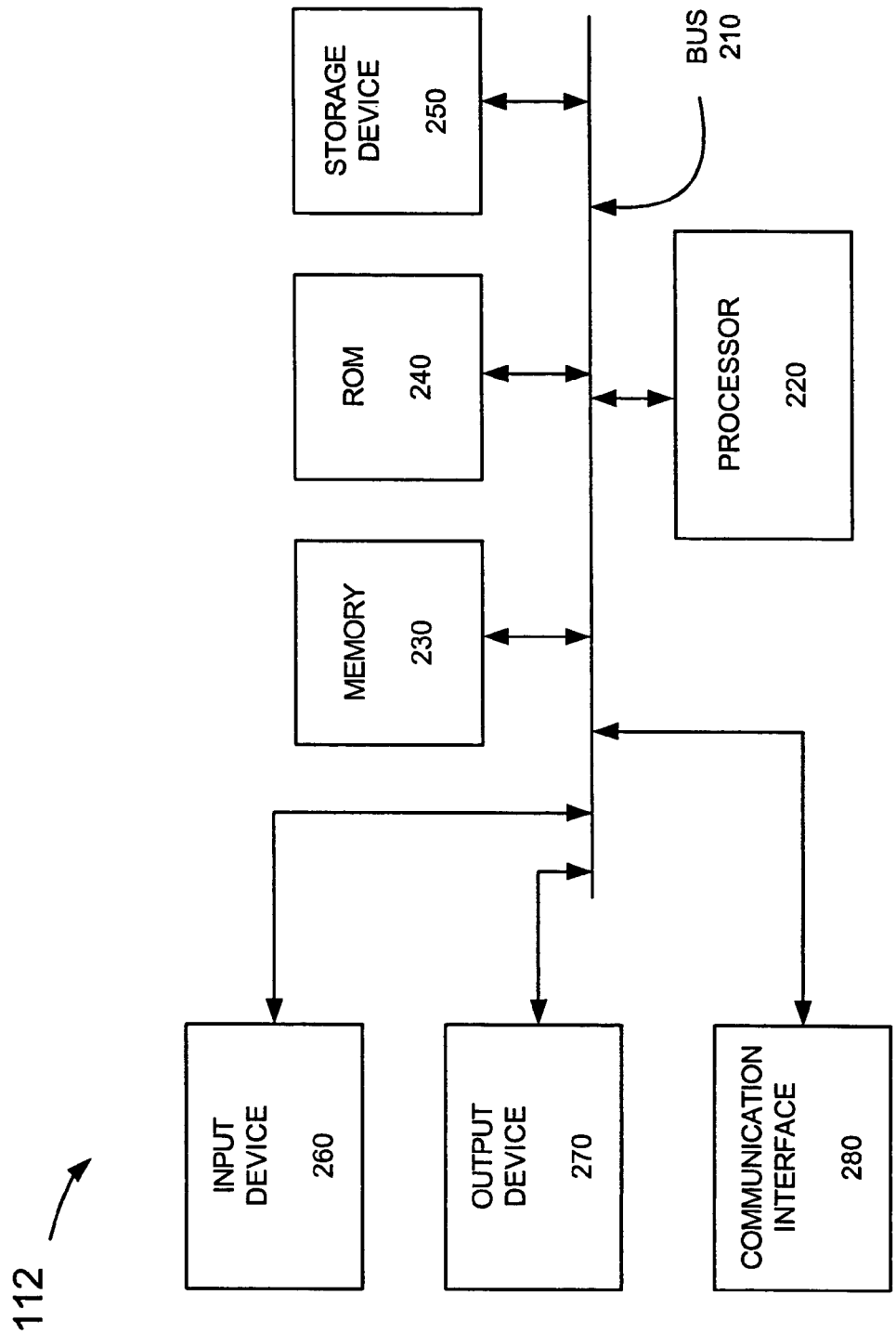
FIG. 2 illustrates an exemplary configuration of a media server in an implementation consistent with the principles of the invention.

FIG. 2 illustrates an exemplary configuration of media server 112 in an implementation consistent with the principles of the invention. It will be appreciated that network gateway 108, service controller 110, and SIP device 116 may be similarly configured. As illustrated, media server 112 may include a bus 210, a processor 220, a memory 230, a read only memory (ROM) 240, a storage device 250, an input device 260, an output device 270, and a communication interface 280. Bus 210 may include one or more conventional buses that permit communication among the components of media server 112.

Processor 220 may include any type of conventional processor or microprocessor that interprets and executes instructions. Memory 230 may include a random access memory (RAM) or another type of dynamic storage device that stores information and instructions for execution by processor 220. Memory 230 may also be used to store temporary variables or other intermediate information during execution of instructions by processor 220.

ROM 240 may include a conventional ROM device and/or another type of static storage device that stores static information and instructions for processor 220. Storage device 250 may include a magnetic disk or optical disk and its corresponding drive and/or some other type of magnetic or optical recording medium and its corresponding drive for storing information and/or instructions.

Input device 260 may include any conventional mechanism or combination of mechanisms that permits the operator to input information to media server 112, such as a keyboard, a mouse, a microphone, a pen-based pointing device, a biometric input device, such as a voice recognition and/or a finger print scanning device. Output device 270 may include any conventional mechanism or combination of mechanisms that outputs information to the operator, including a display, a printer, a speaker, etc.

Communication interface 280 may include any transceiver-like mechanism that enables media server 112 to communicate with other devices and/or systems, such as media firewall 114. For example, communication interface 280 may include a modem and/or an Ethernet interface or port. Alternatively, communication interface 280 may include other mechanisms for communicating via a data network, such as network 102.

Media server 112 may implement the functions described below in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
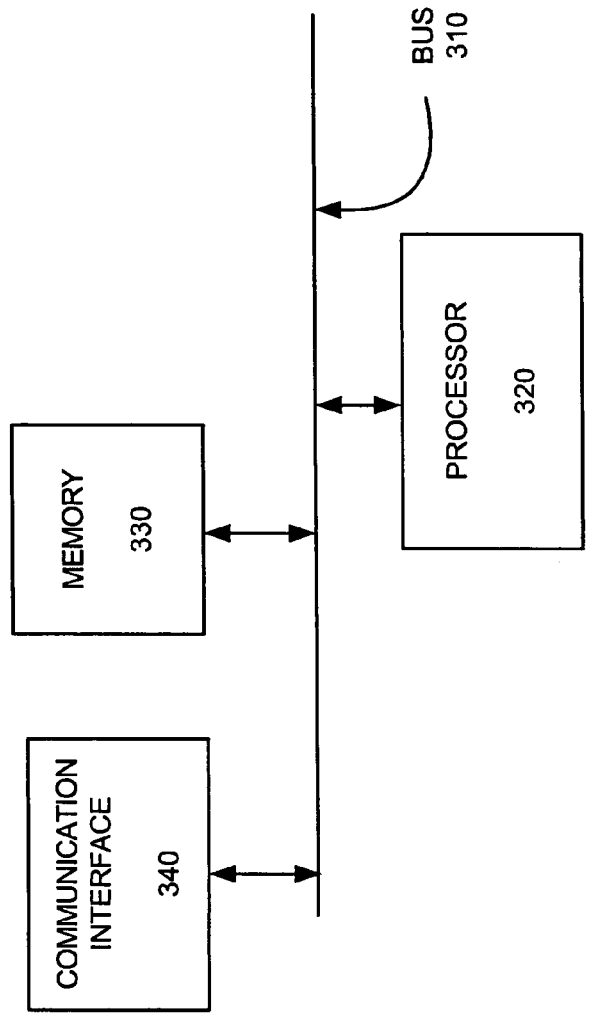
FIG. 3 illustrates an exemplary configuration of a media firewall in an implementation consistent with the principles of the invention.

FIG. 3 illustrates an exemplary configuration of media firewall 114 in an implementation consistent with the principles of the invention. Media firewall 114 may include a bus 310, a processor 320, a memory 330 and a communication interface 340. It will be appreciated that media firewall 114 may include additional components that aid in receiving, processing, and/or transmitting data.

Bus 310 may include one or more conventional buses that permit communication among the components of media firewall 114. Processor 320 may include any type of conventional processor or microprocessor that interprets and executes instructions. Memory 330 may include a RAM or another type of dynamic storage device that stores information and instructions for execution by processor 320. Memory 330 may also be used to store temporary variables or other intermediate information during execution of instructions by processor 320.

Communication interface 340 may include any transceiver-like mechanism that enables media firewall 114 to communicate with other devices and/or systems, such as media server 112. For example, communication interface 340 may include a network interface card (NIC), a communications port, a hardwired connection, etc. Alternatively, communication interface 340 may include other mechanisms for communicating via a data network, such as network 102.

Media firewall 114 may implement the functions described below in response to processor 320 executing software instructions contained in a computer-readable medium, such as memory 330. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Call Handling

In implementations consistent with principles of the invention, media firewall 114 may receive an inbound call from a user, such as a user of telephone device 106, and pass the inbound call to media server 112. Media firewall 114 may also receive outbound calls from media server 112 and pass them on to other devices and/or users on a network, such as a contact center, or a gateway. Media firewall 114 may further perform call handoffs with media server 112, where media firewall 114 bridges an inbound call leg with an outbound call leg using one or more ports and/or a bridging technique. Implementations consistent with principles of the invention, may free up media server ports through the use of bridged media firewall ports. The free media server ports may be available to service additional inbound call legs.

FIGS. 4A and 4B illustrate exemplary implementations for processing a call using a media firewall and a media server consistent with the principles of the invention. The implementation of FIG. 4A may include a media firewall 114 having one or more media firewall ports 402-1 to 402-M (collectively firewall ports 402), a media server 112 having an IVR module 406 and one or more media server ports 404-1 to 404-N (collectively server ports 404), an inbound call leg 405 (referred to as inbound leg 405), and an outbound call leg 410 (referred to as outbound leg 410). The portion of inbound call leg 405 between media firewall 114 and media server 112 will be referred to hereinafter as portion A, and the portion of outbound call leg 410 between media firewall 114 and media server 112 will be referred to hereinafter as portion B.

Media firewall. 114 may receive inbound leg 405 from network 102 via network gateway 108. An inbound leg may consist of a calling session originated by telephone device 106 and/or SIP device 116. For example, a user may place a call to a contact center to obtain assistance. The contact center may be operatively associated with IVR module 406. The user's call may arrive at media firewall 114 as an inbound leg 405 having a destination associated with IVR module 406 on media server 112. Inbound leg 405 may arrive at a network interface, such as firewall port 402-1. Media firewall 114 may pass inbound leg 405 to a network interface associated with media server 112, such as server port 404-1, as portion A. Portion A and B refer to portions of an inbound or outbound call leg, respectively. Portion A and B may be carried over a link; however, the terms portion A and portion B are not intended to refer to the physical link itself, but rather refer to data exchanged between media firewall 114 and media server 112 over a link connecting them.

Media server 112 may process inbound leg 405 using IVR module 406. IVR module 406 may play, for example, recorded messages asking the user to input DTMF signals using a keypad associated with telephone device 106. IVR module 406 may process the DTMF signals generated by the sequence of digits depressed by the user (referred to as a digit sequence). Based on the digit sequence, IVR module 406 may, for example, route inbound leg 405 to an operator associated with the contact center. For example, IVR module 406 may route the user to a customer service representative after identifying the digit sequence received from the user. The user may carry on a conversation with the customer service representative to facilitate processing of the user's request.

The customer service representative may determine that inbound leg 405 should be routed to another destination to further process the user's request. The customer service representative may dial a sequence of digits associated with a forwarded destination. Forwarded destination may refer to a calling destination that is contacted after an initial inbound leg is processed by an initial destination, which, in the example above, is the customer service representative. For example, IVR module 406 may detect the DTMF signals received from the customer service representative (initial destination) and generate an outbound leg 410 for connecting the user with a forwarded destination.

Media server 112 may originate outbound leg 410 using a server port, such as server port 404-2. Outbound leg 410 may be routed through a port of media firewall 114 in route to the forwarded destination. For example, outbound leg 410 may be connected to firewall port 402-2. Media firewall 114 may direct outbound leg 410 to the forwarded destination using firewall port 402-2.

Media servers, such as media server 112, may run complex software applications that interact with numerous interfaces, such as server ports 404. For example, a media server may run multiple IVR applications, text-to-speech (TTS) applications, call forwarding applications, messaging applications, and multimedia applications in conjunction with numerous server ports 404. This complexity may result in relatively high per-port costs for media server ports, such as server ports 404-1 to 404-N. If server ports 404 are not used efficiently, operating costs may remain above a desired level.

For example, a calling session may consist of the activities shown in Table 1, each taking the indicated amount of time on a respective media server port 404-1 to 404-N. In this example, assume an inbound leg is received on a first media server port (e.g., server port 404-1) and an outbound leg is originated using a second media server port (e.g., server port 404-2).

TABLE 1

Exemplary Port Usages for a Media Server Operating on an Inbound Call Leg

| Action | Server Port Usage (sec) |
|---|---|
| User interacting with IVR system using DTMF signals (inbound leg) | 10 ($1^{st}$ port) |
| User interacting with customer service representative (inbound leg) | 60 ($1^{st}$ port) |
| Customer service representative interacting with IVR using DTMF signals to place call to forwarded destination (inbound leg and establishing outbound leg) | 10 ($1^{st}$ port)<br>10 ($2^{nd}$ port) |
| User interacting with forwarded destination (inbound leg and outbound leg) | 300 ($1^{st}$ port)<br>300 ($2^{nd}$ port) |
| Respective port usages | 380 ($1^{st}$ port)<br>310 ($2^{nd}$ port) |

In the above example, server port 404-1 may be used for 380 seconds and server port 404-2 may be used for 310 seconds. In this example, two media server ports are used for 300 seconds to connect the user to a called party (e.g., an operator or technical specialist) at the forwarded destination. Since media server ports may be expensive, tying up server ports for connecting calls not requiring significant DTMF signal detection may be undesirable. Implementations consistent with the principles of the invention may reduce the amount of time that server ports are needed when handling calls.

FIG. 4B illustrates a further aspect of the exemplary implementation of FIG. 4A. When media firewall 114 passes outbound leg 410 from media server 112 to a forwarded destination, media firewall 114 may drop portion A of inbound leg 405 and portion B of outbound leg 410.

Media firewall 114 may maintain the call between the user and the forwarded destination by bridging the firewall port associated with the inbound leg to the firewall port associated with the outbound leg. For example, media firewall 114 may use bridge 408 to connect inbound leg 405 associated with firewall port 402-1 to outbound leg 410 associated with firewall port 402-2. Bridge 408 may be implemented in hardware, software, and/or a combination of hardware and software. The handoff from media server 112 to media firewall 114 may be transparent to the user and to an operator at a destination. The handoff of portion A and portion B may be controlled in whole or in part by service controller 110.

In one implementation, media firewall 114 may bridge firewall port 402-1 to firewall port 402-2 based on a handoff message received from media server 112 and/or service controller 110. When firewall port 402-1 and 402-2 are bridged, a user may participate in a communication session with a forwarded destination using the bridged communication session. Bridged communication session refers to a call, or communication session, routed through media firewall 114 without requiring substantial ongoing DTMF monitoring and/or intervention by other network devices, such as media server 112.

By way of comparison, the call example illustrated in Table 1 used one media server port (404-1) for 380 seconds and another media server port (404-2) for 310 seconds. An implementation consistent with the principles of the invention may employ a bridged communication session where media firewall 114 bridges an inbound leg and an outbound leg together to remove media server 112 from a portion of the calling, or communication, session. For example, referring to the example associated with Table 1, the port usages shown in Table 2 may be realized when using a bridged communication session in conjunction with media firewall 114.

TABLE 2

Exemplary Port Usages for a Media Firewall and a Media Server using a Bridged Communication Session

| Action | Server Port Usage (sec) | Firewall Port Usage (sec) |
|---|---|---|
| User interacting with IVR system using DTMF signals (inbound leg) | 10 ($1^{st}$ port) | 10 ($1^{st}$ port) |
| User interacting with customer service representative (inbound leg) | 60 ($1^{st}$ port) | 60 ($1^{st}$ port) |
| Customer service representative interacting with IVR using DTMF signals to place call to forwarded destination (inbound leg and outbound leg) | 10 (1st port) 10 ($2^{nd}$ port) | 10 (1st port) 10 ($2^{nd}$ port) |
| User interacting with forwarded destination (bridged communication session) | 0 (1st port) 0 ($2^{nd}$ port) | 300 ($1^{st}$ port) 300 ($2^{nd}$ port) |
| Respective port usages | 80 ($1^{st}$ port) 10 ($2^{nd}$ port) | 380 ($1^{st}$ port) 310 ($2^{nd}$ port) |

Media server port usage may be reduced from 380 seconds to 80 seconds for a first port associated with an inbound leg and from 310 seconds to 10 seconds for a second port associated with an outbound leg. As seen from these examples, significant reductions in media server port usage may be realized when media firewall 114 bridges an inbound leg to an outbound leg and performs DTMF signal detection on the bridged calling session.

Referring back to FIG. 4B, media firewall 114 may monitor the bridged communication session for DTMF signals. When a DTMF signal is detected, media firewall 114 may process the signal before reestablishing inbound leg 405 (i.e., portion A) and/or outbound leg 410 (i.e., portion B) with media server 112, or media firewall 114 may reestablish inbound leg 405 and/or outbound leg 410 with media server 112 whenever a DTMF tone is detected. Media server 112 may process DTMF signals when media firewall 114 does not process DTMF signals, or both media firewall 114 and media server 112 may process a DTMF signal.

Media firewall 114 may detect DTMF signals using digital signal processing (DSP) techniques known in the art and/or by looking for encoded DTMF signals within packets passing through firewall ports 402. For example, DTMF signals may be encoded in IP packets using industry standard protocols, such as RFC 2883. Use of encoded DTMF signals in packets facilitates efficient and inexpensive monitoring for DTMF signals since DSP cards and/or interfaces may not be required.

Implementations of modern contact centers may employ a technique called "take back and transfer" (TNT). TNT allows a destination, such as the forwarded destination, to transfer a call back to media server 112 and/or another destination, such as in call forwarding or conference calling. TNT may be accomplished using a special sequence of DTMF signals. For example, TNT may be initiated when a party dials "*8" using a keypad associated with a telephone device. When a processing device detects DTMF signals associated with *8, inbound leg 405 may be connected to IVR module 406 using a server port 404-1 to 404-N by way of TNT inbound leg 415. Dialing *8 may further cause the forwarded destination to be connected to IVR module 406 by way of TNT outbound leg 420. A processing device associated with firewall 114 and/or media server 112 may monitor the duration of the bridged communication session to ensure that TNT digit sequences are promptly detected.

Implementations consistent with the principles of the invention may implement processing functions associated with DTMF signal detection, including TNT, in media firewall 114. Implementing DTMF signal detection in media firewall 114 may have advantages as compared to performing TNT detection in media server 112. For example, performing DTMF signal detection in media firewall 114 may associate DTMF detection with ports having lower costs, as compared to media server ports, and/or performing DTMF signal detection in media firewall 114 may reduce the amount of time that media server ports are used to monitor calls.

Exemplary Method

FIG. 5 illustrates an exemplary flowchart showing a method for processing a call in accordance with an implementation consistent with principles of the invention. Processing may begin with media firewall 114 receiving an incoming call using inbound leg 405 (act 502). For example, a user may call a contact center for help with troubleshooting a problem associated with a personal computer. It is assumed for this example that the user places the call using telephone device 106.

Media firewall 114 may connect inbound leg 405 to a server port 304-1 to 304-N associated with a media server 112 (act 504). For example, media firewall 114 may connect inbound leg 405 to server port 404-1.

Media server 112 may perform IVR interactions on inbound leg 405 using IVR module 406 (act 506). For example, IVR module 406 may request that the user enter a customer number or a serial number associated with the broken computer. In response to the request, the user may enter a digit sequence by, for example, entering the appropriate digits on telephone device 106. Media server 112 may receive and process DTMF signals produced by the user entering the digit sequence and perform an action based on the processing. For example, IVR module 406 may connect the user with a customer service representative after processing DTMF signals received from the user. The customer service representative may ask the user to provide details about a problem with the computer. Assume, for example, that the user has described a problem associated with the operating system of the computer in response to questions asked by the customer service representative. The customer service representative may determine that the user needs to be connected to a specialist having expertise with the particular operating system running on the user's computer. The customer service representative may dial a sequence of digits associated with the appropriate specialist, and IVR module 406 may detect the DTMF signals generated by the customer service representative.

In response, media server 112 may establish an outbound leg 410 using a server port and a port associated with firewall 114 (act 508). Media server 112 may establish outgoing leg 410 so as to connect the user with the specialist, located at a forwarded destination. In one implementation, outbound leg 410 may be established using different ports on media server 112 and media firewall 114 than were used for inbound leg 405. Assume, for example, that outbound leg 410 is established using server port 404-2 and firewall port 402-2.

Media firewall 114 may bridge inbound leg 405 with outbound leg 410 using bridge 408 (act 510). Media firewall 114 may bridge firewall port 402-1 to firewall port 402-2 and may drop portion A of inbound leg 405 and portion B of outbound leg 410 (See FIG. 4A). The handoff from media server 112 to media firewall 114 may be transparent to the user, the operating system specialist, and/or the forwarded destination.

Media firewall 114 may monitor inbound leg 405 and/or outbound leg 410 for DTMF signals (act 512). When a DTMF signal is detected, media firewall 114 may handoff inbound leg 405 and/or outbound leg 410 to media server 112 using TNT inbound leg 415 and/or TNT outbound leg 420 (act 514). For example, media firewall 114 may support a bridged communication session between the user and the operating system specialist using firewall port 402-1, firewall port 402-2, and bridge 408. Media firewall 114 may detect a DTMF signal including a digit sequence, such as "*8". When *8 is detected, media firewall 114 may reestablish inbound leg 405 and/or outbound leg 410 with media server 112 via TNT inbound leg 415 and/or TNT outbound leg 420, respectively.

Media server 112 may perform additional processing of inbound leg 405 or outbound leg 410 using IVR module 406 (act 516). Media server 112 may also process the retrieved legs using other techniques, such as by using a human operator, a TTS module and/or a voice recognition module. Media server 112 may connect inbound leg 405 and/or outbound leg 410 to an additional outbound leg for establishing a call with a second forwarded destination.

For example, the customer service representative may determine that the user was able to solve only a portion of the computer problem by speaking with the operating system specialist. The customer service representative may determine that the user needs to speak with the operating system specialist and a hardware specialist simultaneously. Media server 112 may keep inbound leg 405 and outbound leg 410 active while initiating a second outbound leg to the hardware specialist. After making contact with the hardware specialist, media server 112 may handoff inbound leg 405, outbound leg 410 and the second outbound leg to media firewall 114. Media firewall 114 may bridge all three legs together in a conference call using one or more bridges operating in conjunction with firewall ports 402. Media firewall 114 may monitor the bridged legs for DTMF signals. If DTMF signals are detected, media firewall 114 may hand off inbound leg 405, outbound leg 410 and/or the second outbound leg to media server 112.

Exemplary Call Flow for Inbound Leg

Figure 6:
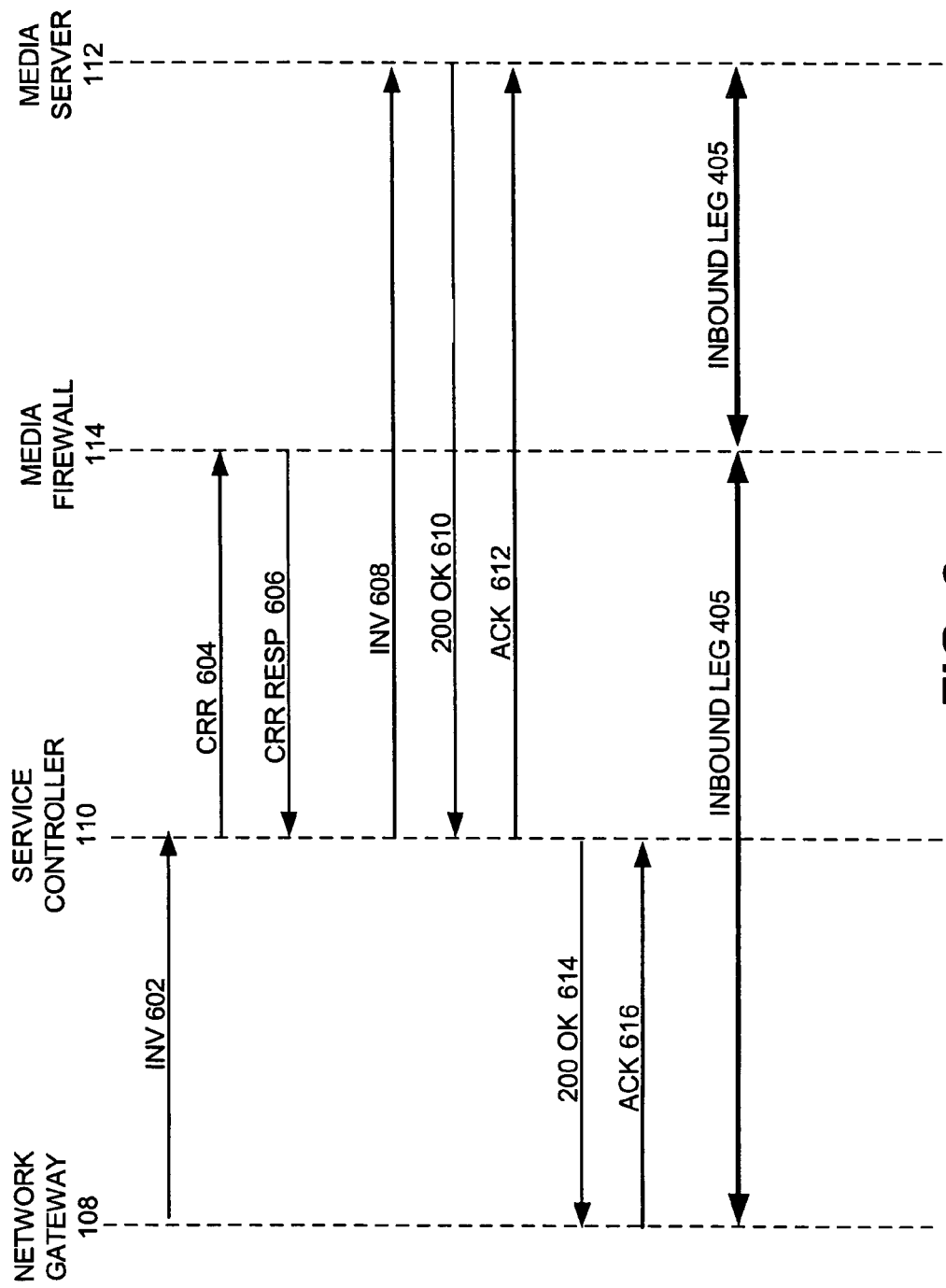
FIG. 6 illustrates exemplary signaling that may be used for establishing an inbound leg in an implementation consistent with the principles of the invention.

FIG. 6 illustrates exemplary signaling that may be used for establishing an inbound leg 405 in an implementation consistent with the principles of the invention. The exemplary signaling flow of FIG. 6 may include network gateway 108, service controller 110, media server 112 and media firewall 114.

To initiate the signaling flow of FIG. 6, service controller 110 may receive an INVITE request 602 from network gateway 108 in response to a user dialing a sequence of digits. INVITE request 602 may indicate that the called party is being invited to participate in a session. The INVITE request 602 may provide the called party with enough information to join the session. For example, INVITE request 602 may include a session description protocol (SDP) portion. SDP is a short structured textual description of the name and purpose of the session, and the media, protocols, codec formats, timing and transport information that are used to decide whether a session is likely to be of interest. SDP may further include information for informing the called device how to start media tools to participate in the session. INVITE request 602 may also indicate the type of media that the calling party's telephone device 106 is able to receive and/or possibly the media that the calling party's telephone device is willing to send.

In response to INVITE request 602, service controller 110 may transmit a create resource command (CRR) 604 to media firewall 114. Media firewall 114 may respond with a CRR response 606. CRR response 606 may include information relating to source and destination firewall ports. For example, CRR response 606 may include an address associated with source and destination firewall ports. The source port may include a port to which an inbound leg may be established and the destination port may include a port from which an inbound leg may be established between media firewall 114 and media server 112. This port information may be used to construct an SDP that is included in an INVITE message 608 that may be sent from service controller 110 to media server 112. Media server 112 may use the media firewall source port information associated with inbound leg 405 to construct an SDP for inclusion in a 200 OK response message 610 sent from media server 112 to service controller 110. The 200 OK response message 610 may indicate that the INVITE message 608 was successfully received and acknowledged and may include media server port information to which the inbound leg is to be established.

Service controller 110 may respond to the 200 OK response 610 with an acknowledgement (ACK) message 612 indicating that the 200 OK message 610 was received. Service controller 110 may send a 200 OK response 614 to network gateway 108. 200 OK response 614 may include information relating to the media firewall source port. Network gateway 108 may acknowledge receipt of the 200 OK response 614 with an ACK message 616. The above signaling may result in an inbound leg 405 being established between network gateway 108 and media firewall 114, via a source port associated with media firewall 114, and between media firewall 114 and media server 112, via a destination port associated with media firewall 114. Inbound leg 405 may include an RTP session for facilitating voice communication.

Exemplary Call Flow for Outbound Leg

Figure 7:
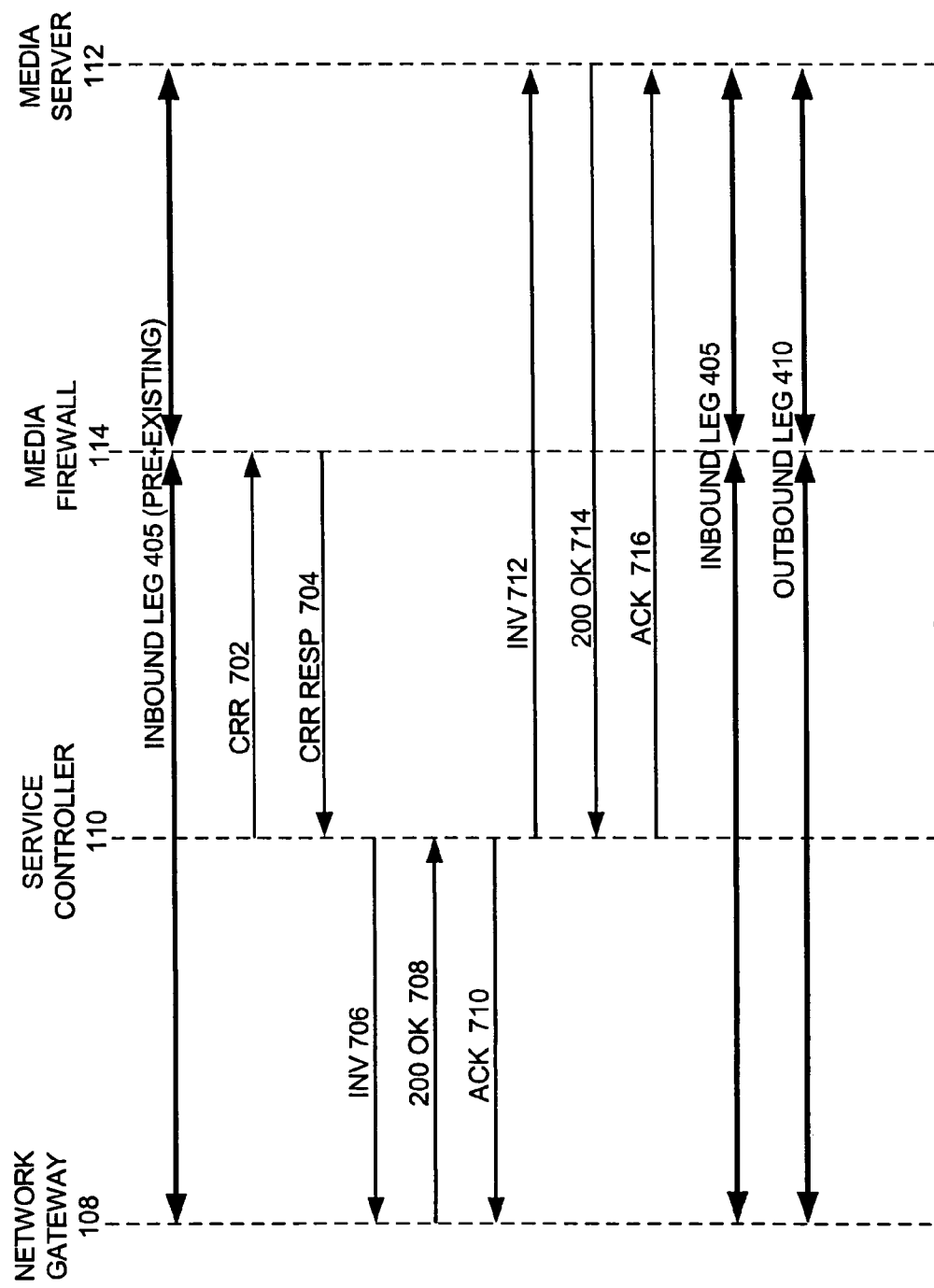
FIG. 7 illustrates exemplary signaling that may be used for establishing an outbound leg in an implementation consistent with the principles of the invention.

FIG. 7 illustrates exemplary signaling that may be used for establishing an outbound leg 410 in an implementation consistent with the principles of the invention. The exemplary signaling of FIG. 7 may include network gateway 108, service controller 110, media server 112 and media firewall 114. Inbound leg 405 may exist when the signaling of FIG. 7 commences.

Service controller 110 may send a CRR message 702 to media firewall 114. Media firewall 114 may respond with a CRR response 704 that may include information about source and destination firewall port to be used for outbound leg 410. CRR response 704 may be sent from firewall 114 to service controller 110. Service controller 110 may send an INVITE request 706 to network gateway 108. INVITE request 706 may include an SDP containing information about media firewall 114. The SDP of INVITE request 706 may include, for example, information about the type of session being requested. INVITE request 706 may be directed to a device associated with a forwarded destination. For example, INVITE request 706 may be directed to a telephone device associated with the operating system specialist associated with the example discussed in conjunction with FIG. 5.

Service controller 110 may receive a 200 OK message 708 from network gateway 108. 200 OK response 708 may indicate that INVITE request 706 was successfully received and acknowledged and may include gateway port information to which outbound leg 410 is to be established. Service controller 110 may respond to 200 OK response 708 with an ACK response 710. ACK response 710 may constitute an acknowledgement that the 200 OK response 708 was received by service controller 110. ACK response 710 may also act as the final message exchange between network gateway 108 and service controller 110 when establishing an outbound call leg.

Service controller 110 may send an INVITE message 712 to media server 112. INVITE message 712 may include an SDP containing information about the requested session. For example, the SDP may include information about firewall 114 being used to establish the outbound leg. For example, the SDP may include information identifying a destination port associated with media firewall 114. Media server 112 may respond to receipt of INVITE message 712 by sending a 200 OK message 714. 200 OK message 714 may indicate that E message 712 was successfully received and may identify a port on media server 112 from which outbound leg 410 is to be established. Service controller 110 may respond to receipt of the 200 OK message 714 by sending an ACK message 716. ACK message 716 may operate as a final handshake in the message exchange between service controller 110 and media server 112 before establishing outbound leg 410 using media firewall 114.

Exemplary Call Flow for Bridging a Call

Figure 8:
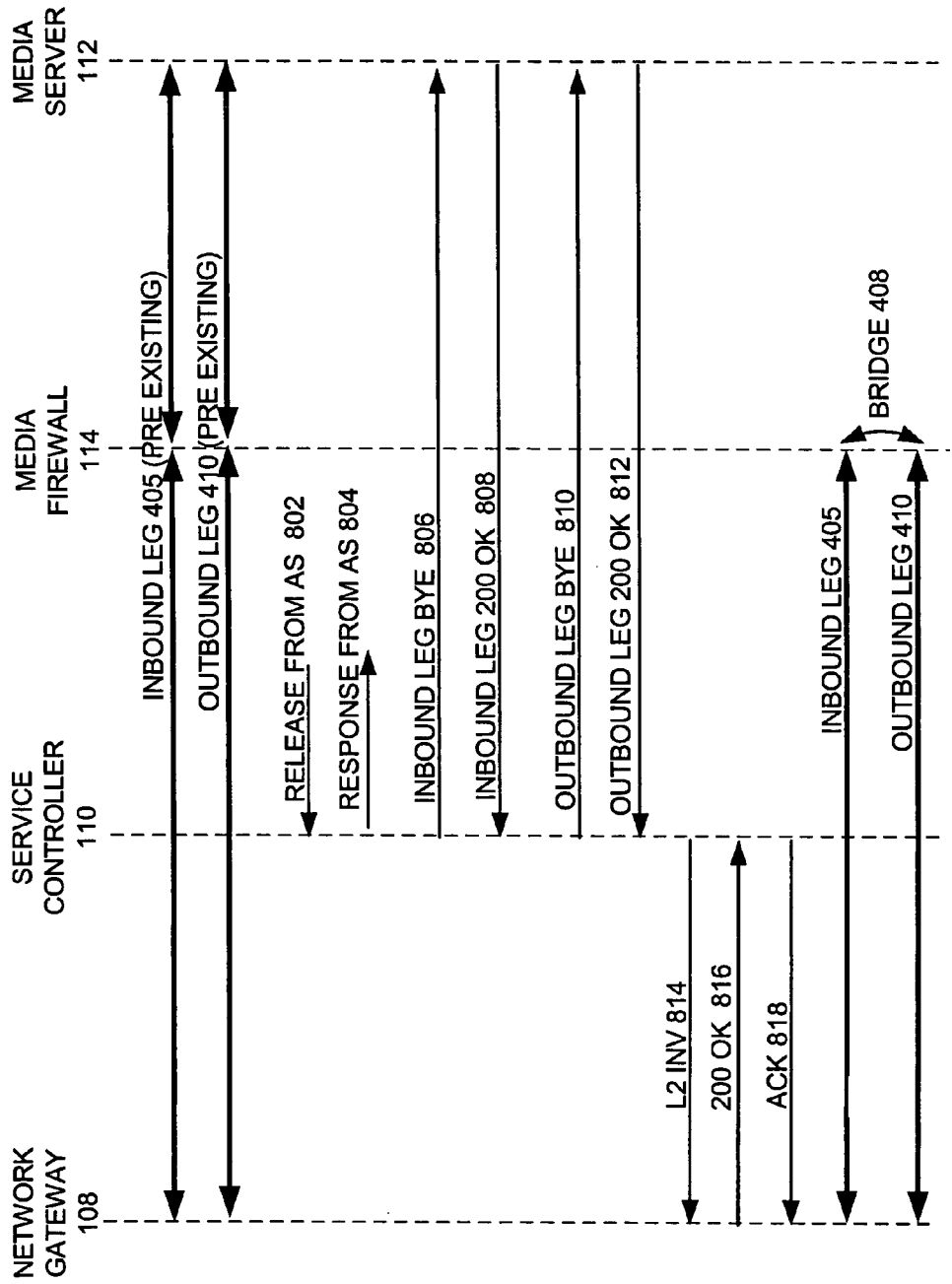
FIG. 8 illustrates exemplary signaling that may be used for establishing a bridged communication session via a media firewall in an implementation consistent with the principles of the invention.

FIG. 8 illustrates exemplary signaling that may be used for establishing a bridged communication session via a media firewall in an implementation consistent with the principles of the invention. The exemplary signaling of FIG. 8 may include network gateway 108, service controller 110, media server 112 and media firewall 114. An inbound leg 405 and an outbound leg 410 may exist at the completion of the signaling flow of FIG. 7.

Processing may begin with service controller 110 receiving a message requesting that one or more call legs be released from media server 112. For example, an application server residing on network 102 may contact service controller 110 and request that portion A of inbound leg 405 and portion B of outbound leg 410 be released. The application server may send a release message 802 to service controller 110 to initiate the release of portion A and portion B of the respective call legs. Service controller 110 may issue a response message 804 to the application server indicating that the release message 802 has been received.

Service controller 110 may issue an inbound leg 405 BYE request 806 to media server 112. Inbound leg 405 BYE request 806 may include information useful for effectuating the release of portion A of inbound leg 405. Media server 112 may respond with an inbound leg 405 200 OK response 808 to acknowledge that BYE request 806 was received. Service controller 110 may issue an outbound leg 410 BYE request 810 to media server 112. Outbound leg 410 BYE request 810 may include information useful for effectuating the release of portion B of outbound leg 410. Media server 112 may respond with an outbound leg 410 200 OK response 812 to acknowledge that BYE request 810 was received.

Service controller 110 may send an INVITE request 814 to network gateway 108 regarding outbound leg 410. For example, INVITE request 814 may include a SDP containing information about retaining inbound leg 405 during and/or after portion A is dropped and bridge 408 is in place for the call. INVITE request 814 may operate as a re-invitation sent from service controller 110 to network gateway 108 to reestablish outbound leg 410 via bridge 408. Implementations may include a re-invitation for inbound leg 405 in addition to, or in lieu of, the re-invitation for outbound leg 410.

Network gateway 108 may respond to INVITE request 814 with a 200 OK response 816. 200 OK response 816 may indicate that INVITE request 814 was received by network gateway 108 and may include information identifying the gateway port to which outbound leg 410 is established. Service controller 110 may respond with an ACK response 818 to acknowledge receipt of the 200 OK response 816. ACK response 818 may act as the final handshake in the exchange between network gateway 108 and service controller 110.

Portion A of inbound leg 405 and portion B of outbound leg 410 may be dropped after the message exchange (messages 814-818) between service controller 110 and network gateway 108. Bridge 408 may be employed to maintain connectivity between inbound leg 405 and outbound leg 410 using one or more firewall ports. Firewall 114 may monitor inbound leg 405 and outbound leg 410 for DTMF signals while bridge 408 is in place as set forth above with respect to FIG. 4.

Exemplary Call Flow for Un-Bridging a Call

Figure 9:
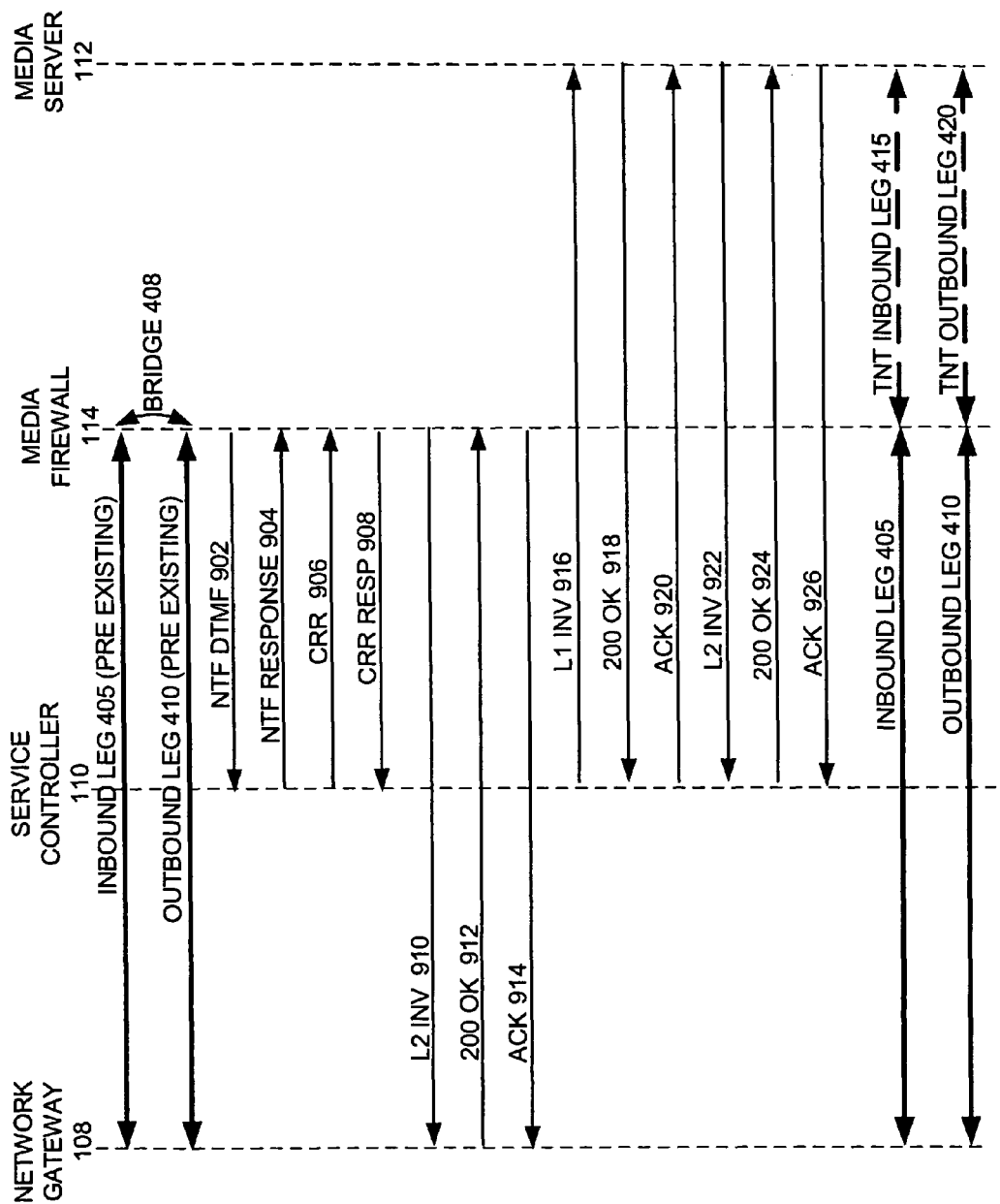
FIG. 9 illustrates exemplary signaling that may be used for taking back a bridged communication session from a media firewall in an implementation consistent with the principles of the invention.

FIG. 9 illustrates an exemplary signaling that may be used for taking back a bridged connection from a media firewall in an implementation consistent with the principles of the invention. The exemplary signaling of FIG. 9 may include network gateway 108, service controller 110, media server 112 and media firewall 114. A bridged call may exist after the signaling flow illustrated in FIG. 8. Assume that media firewall 114 detects a DTMF signal on inbound leg 405 and/or outbound leg 410. The signaling flow illustrated in conjunction with FIG. 9 may be implemented upon detection of the DTMF signal by media firewall 114.

Media firewall 114 may detect a DTMF signal and send a notify-DTMF (NTF-DTMF) message 902 to service controller 110. NTF-DTMF message 902 may include information about the leg on which the DTMF signal was detected and information about the digit sequence responsible for the DTMF signals. Service controller 110 may respond with a notify-response message 904. Service controller 110 may send a CRR message 906 to media firewall 114. Media firewall 114 may respond with a CRR response 908. CRR response 908 may include information about the firewall ports required to establish TNT inbound leg 415 and/or TNT outbound leg 420 with media server 112.

Media firewall 114 may send an INVITE request 910 to network gateway 108. INVITE request 910 may include an SDP containing information about a call leg that will be reconnected to media server 112 using one of the TNT legs. In one implementation, the SDP may include information identifying a source port of media firewall 114 with which the leg is associated. INVITE request 910 may operate as a re-invitation request for outbound leg 410. INVITE request 910 may cause outbound leg 410 to be associated with a new and/or separate port on media firewall 114 when communicating with media server 112. Implementations may employ a re-invitation request associated with inbound leg 405 if desired. For example, a re-invitation request may cause inbound leg 405 to become associated with a new and/or separate port on media firewall 114.

Network gateway 108 may respond with a 200 OK response 912 indicating that INVITE request 910 was received and understood. In one implementation, 200 OK response 912 may include information identifying a port of gateway 108. Media firewall 114 may respond to receipt of 200 OK response 912 with an ACK response 914.

Service controller 110 may send an INVITE message 916 to media server 112. INVITE message 916 may include an SDP containing information about the firewall ports used for establishing TNT legs to media server 112. For example, the SDP may include information pertaining to an invitation for connecting inbound leg 405 to a session with media server 112. Media server 112 may respond by sending a 200 OK 918 message to service controller 110. 200 OK message 918 may indicate that INVITE message 916 was received and understood by media server 112 and may include information identifying the port of media server 112 to which inbound leg 305 is to be established. Service controller 110 may send an ACK message 920 to indicate that the 200 OK message 918 was received.

Media server 112 may generate and send an INVITE message 922 to session controller 110. INVITE message 922 may include an SDP containing information about a call leg associated with one or more TNT legs. For example, the SDP of INVITE message 922 may include information for associating outbound leg 410 with TNT leg 420 and/or information about a server port used for receiving TNT leg 420. Service controller 110 may respond to INVITE message 922 by sending a 200 OK message 924 to media server 112. 200 OK message 924 may indicate that INVITE message 922 was received and understood and may identify the port of media server 112 from which outbound leg 410 is to be established. Media server 112 may send an ACK message 926 to service controller 110 to acknowledge receipt of 200 OK message 924. ACK message 926 may act as a final handshake message in the exchange between media server 112 and session controller 110.

TNT leg 415 and/or TNT leg 420 may be established between firewall 114 and media server 112 using firewall ports 402 and media server ports 404. After establishing TNT legs 415 and 420, IVR module 406 may operate on inbound leg 405 and/or outbound leg 410 to further process DTMF signals associated with the calling session.

Implementations consistent with the principles of the invention employing signaling flows, such as those illustrated in FIGS. 6-9, may reduce the amount of time media server ports are used to support a particular calling session. In particular, implementations may operate to substantially restrict use of media server ports to those portions of a call requiring DTMF signal processing and/or IVR interaction. As a result, implementations may enable a given number of media server ports to service a larger number of calls than might be possible if media firewall 114 did not operate to bridge an inbound call leg to an outbound call leg.

Implementations consistent with the principles of the invention may be used to facilitate re-origination requests using, for example, pre-paid calling cards. For example, a user may make a first call using an account number associated with, for example, a conventional calling card and/or a pre-paid calling card. At the end of the first call, the user may dial a special digit sequence, such as "2." The DTMF signals created by the digit sequence 2 may act as a re-origination request. The re-origination request may let the user dial a new number associated with a called party without hanging up the handset and/or without having to re-enter information about the calling card, such as a serial number, an account number, and/or authorization number. Media firewall 114 may detect **2 and cause portion B to be dropped, cause media server 112 to establish a new outbound leg, and cause firewall 114 to drop portion A and B after bridging the new outbound leg with the current inbound leg.

Implementations consistent with the principles of the invention may be used to facilitate enhanced call routing features, such as call forwarding, call take back, call give back, and signal transfer. These enhanced call routing features may be facilitated using media firewall 114 and DTMF signal detection and/or processing associated with one or more media firewall ports.

CONCLUSION

Systems and methods, consistent with the principles of the invention, allow for the handoff of call legs from a media server to a media firewall to thereby free up the media server to perform other functions.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 5-9, the order of the acts may be varied in other implementations consistent with the invention. Moreover, non-dependent acts may be implemented in parallel.

No element, act, or instruction used in the description of the application should be construed as critical or essential to the invention unless explicitly described as such. Also, as used herein, the article "a" is intended to include one or more items. Where only one item is intended, the term "one" or similar language is used. Further, the phrase based on is intended to mean based, at least in part, on unless explicitly stated otherwise.

The scope of the invention is defined by the claims and their equivalents.

What is claimed is:

1. A first network device for establishing a communication session between a calling party and a destination, the first network device comprising:
 a first network interface to:
  receive, from the calling party, a first inbound portion of an inbound call leg, and
  transmit, to a second network device, a second inbound portion of the inbound call leg;
 a second network interface to:
  receive, from the second network device, a first outbound portion of an outbound call leg that connects the calling party with the destination, and
  transmit, to the destination, a second outbound portion of the outbound call leg; and
 a processor operatively associated with the first network interface and the second network interface, the processor to:
  cause the first network interface to transmit the second inbound portion to the second network device,
  cause the second network interface to receive the first outbound portion when the second network device has interacted with the second inbound portion, and
  bridge the first inbound portion to the second outbound portion, in response to detecting a particular dual tone multifrequency (DTMF) signal, to maintain connectivity, where when bridging the first inbound portion to the second outbound portion, the processor is to:
  cause the second inbound portion to be dropped in response to a BYE request associated with the second inbound portion, and
  cause the first outbound portion to be dropped in response to a BYE request associated with the first outbound portion.

2. The first network device of claim 1, where the processor bridges the first inbound portion to the second outbound portion in response to a bridging instruction received from the first network device or a third network device.

3. The first network device of claim 1, where the first network device includes a firewall device and the second network device includes an interactive voice response system.

4. The first network device of claim 3, where the interactive voice response system is associated with a contact center.

5. The first network device of claim 1, where the inbound call leg is associated with an INVITE request processed by the second network device.

6. The first network device of claim 1, where the processor is further to:
 detect a second DTMF signal associated with at least one of the inbound call leg or the outbound call leg.

7. The first network device of claim 6, where the processor is further to:
 cause at least one of the second inbound portion or the first outbound portion to be re-established when the second DTMF signal is detected.

8. The first network device of claim 7, where the second DTMF signal is associated with a calling card.

9. A device-implemented media server comprising:
 an interactive voice response (IVR) module to process a dual tone multifrequency (DTMF) signal associated with an inbound call leg from a caller;
 a first network interface to receive the inbound call leg;
 a second network interface to transmit, in response to an INVITE request, an outbound call leg to a network device; and
 a processor to:
  cause the first network interface to transmit the inbound call leg to the IVR module,
  cause the second network interface to transmit the outbound call leg to the network device, based on the processing performed by the IVR module, where the outbound call leg connects the caller to a destination that is communicatively connected to the caller by the network device,
  handoff the inbound call leg and the outbound call leg to the network device, and
  reconnect to at least one of the inbound call leg or the outbound call leg when a second DTMF signal, associated with at least one of the inbound call leg or the outbound call leg, is detected.

10. The media server of claim 9, where the processor is further to:
 handoff the incoming call leg in response to a BYE request associated with the inbound call leg, and
 handoff the outbound call leg in response to a BYE request associated with the outbound call leg.

11. The media server of claim 9, where the network device includes a firewall.

12. The media server of claim 9, where the inbound call leg and the outbound call leg are associated with a packet network.

13. A system to establish a calling session in a communications network, the system comprising:
 a device-implemented media server having a first media server port and a second media server port;
 a device-implemented media firewall to:
  receive, at a first media firewall port, a first inbound call leg portion of an inbound call leg via the network,
  transmit, to the first media server port, a second inbound call leg portion of the inbound call leg,
  receive, from the second media server port, a first outbound call leg portion of an outbound call leg,
  transmit, to a destination device, a second outbound call leg portion of the outbound call leg,
  bridge the first inbound call leg portion to the second outbound call leg portion, the bridging causing the media server to be removed from the communication session, and
  reconnect the inbound call leg to the first media server port and the outbound call leg to the second media server port in response to detecting a dual tone multifrequency (DTMF) signal.

14. The system of claim 13, where the media server disconnects the first media server port from the inbound call leg and the second media server port from the outbound call leg.

15. The system of claim 13, where the DTMF signal is associated with at least one of a re-originate request associated with a pre-paid calling card, a take back and transfer request associated with a calling session, or an enhanced call routing request.

16. The system of claim 13, further comprising:
 a device-implemented service controller for sending an INVITE request to the media server to facilitate establishing the calling session.

17. The system of claim 13, further comprising:
 a device-implemented interactive voice response system operatively associated with the media server for processing the inbound call leg.

18. The system of claim 13, where the media firewall further comprises:
- a processor to monitor the first inbound call leg portion or the second outbound call leg portion for a particular dual tone multifrequency (DTMF) signal.

19. A method for processing a call on a network, comprising:
- receiving, at a second network device having an interactive voice response (IVR) device, an inbound call leg, from a caller, via a first network device;
- processing the inbound call leg using the IVR device;
- generating, by the second network device, an outbound call leg based on the processing of the inbound call leg, where the outbound call leg connects the caller to a destination;
- transmitting the outbound call leg to the first network device;
- handing off, from the IVR device to the first network device, the inbound call leg, in response to a BYE request associated with the inbound call leg, and handing off the outbound call leg, in response to a BYE request associated with the outbound call leg, where the inbound call leg and the outbound call leg are subsequently dropped;
- detecting, by the second network device, a dual tone multifrequency (DTMF) signal; and
- causing at least one of the inbound call leg or the outbound call leg to be reestablished with the IVR device in response to detecting the DTMF signal.

20. The method of claim 19, further comprising:
- receiving, at the second network device, a handoff message from a service controller prior to handing off the inbound call leg and the outbound call leg, the handoff message causing the first network device to bridge the inbound call leg and the outbound call leg.

21. The method of claim 20, where the handoff message is a session initiation protocol message.

22. The method of claim 19, further comprising:
- receiving, at a service controller, an INVITE request associated with the caller, the INVITE request for initiating the inbound call leg.

23. The method of claim 19, where the IVR device is associated with a contact center.

24. The method of claim 19, where at least one of the inbound call leg or the outbound call leg is established with the IVR device via the second network device.

25. The method of claim 19, where the inbound call leg is associated with a pre-paid calling card.

\* \* \* \* \*